US011413736B2

(12) United States Patent
Schlegel et al.

(10) Patent No.: US 11,413,736 B2
(45) Date of Patent: Aug. 16, 2022

(54) HAND-HELD POWER TOOL

(71) Applicant: Robert Bosch GmbH, Stuttgart (DE)

(72) Inventors: Andreas Schlegel, Leinfelden-Echterdingen (DE); Christian Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 16/789,073

(22) Filed: Feb. 12, 2020

(65) Prior Publication Data

US 2020/0180132 A1 Jun. 11, 2020

Related U.S. Application Data

(62) Division of application No. 15/349,013, filed on Nov. 11, 2016, now Pat. No. 10,661,423.

(30) Foreign Application Priority Data

Nov. 11, 2015 (DE) ...................... 10 2015 222 152.0

(51) Int. Cl.
*B25F 5/00* (2006.01)
*B25D 16/00* (2006.01)
(Continued)

(52) U.S. Cl.
CPC ............. *B25F 5/00* (2013.01); *B25D 11/005* (2013.01); *B25D 16/00* (2013.01); *B25D 16/006* (2013.01); *B25D 17/08* (2013.01); *F16P 3/00* (2013.01); *B25D 2216/0069* (2013.01); *B25D 2250/131* (2013.01); *B25D 2250/221* (2013.01); *B25D 2250/261* (2013.01)

(58) Field of Classification Search
CPC ...... B25D 16/00; B25D 16/006; B25D 17/00; B25D 17/08; B25F 5/00
USPC ............................. 173/1–2, 214; 700/83, 17
See application file for complete search history.

(56) References Cited

U.S. PATENT DOCUMENTS 4,066,133 A * 1/1978 Voss ...................... B25B 23/147
173/182
6,424,799 B1 * 7/2002 Gilmore ................ B23P 19/066
318/432

(Continued)

FOREIGN PATENT DOCUMENTS

CN 1543389 A 11/2004
CN 2821850 Y 9/2006
(Continued)

*Primary Examiner* — Valentin Neacsu
(74) *Attorney, Agent, or Firm* — Maginot, Moore & Beck LLP

(57) ABSTRACT

The disclosure is based on a hand-held power tool having at least one switch device which comprises at least one switching element at least for activating a power supply of a drive unit, having at least one quick-change tool holder which is provided for holding an insertion tool which is different from an insertion tool with an SDS® shaft having a maximum transverse extent of 10 mm and/or having at least one accumulator interface. It is proposed that the at least one switching device comprises at least one locking unit which is provided for maintaining, at least essentially independently of an effect of an operator activation force, an active operating mode which can be activated by actuating the at least one switching element.

17 Claims, 5 Drawing Sheets

(51) Int. Cl.
*B25D 11/00* (2006.01)
*B25D 17/08* (2006.01)
*F16P 3/00* (2006.01)

(56) References Cited

U.S. PATENT DOCUMENTS

| | | | | |
|---|---|---|---|---|
| 7,182,148 | B1* | 2/2007 | Szieff | B25B 21/00 173/171 |
| 8,857,532 | B2* | 10/2014 | Wallgren | B25B 23/14 173/1 |
| 8,954,895 | B1* | 2/2015 | Yaksick | G06F 3/04883 715/863 |
| 2002/0129948 | A1* | 9/2002 | Wursch | B23B 49/006 173/4 |
| 2002/0145724 | A1* | 10/2002 | Wursch | B25H 1/0092 356/4.01 |
| 2006/0185865 | A1* | 8/2006 | Jung | B25D 16/006 173/48 |
| 2008/0302549 | A1* | 12/2008 | Zeiler | B23B 45/00 173/46 |
| 2009/0126962 | A1 | 5/2009 | Jung et al. | |
| 2009/0229842 | A1* | 9/2009 | Gray | H01M 10/488 173/20 |
| 2010/0241431 | A1* | 9/2010 | Weng | G06F 3/038 704/257 |
| 2011/0050589 | A1* | 3/2011 | Yan | G01C 21/3664 345/173 |
| 2011/0114345 | A1* | 5/2011 | Schlesak | B25F 5/024 173/1 |
| 2011/0120738 | A1* | 5/2011 | Miwa | B23B 45/02 173/2 |
| 2012/0090863 | A1* | 4/2012 | Puzio | B25B 21/02 173/2 |
| 2012/0103643 | A1* | 5/2012 | Binder | B25F 5/001 173/2 |
| 2012/0105613 | A1* | 5/2012 | Weng | G01C 21/3664 348/77 |
| 2012/0169256 | A1* | 7/2012 | Suda | B25B 21/02 318/17 |
| 2012/0199372 | A1* | 8/2012 | Nishikawa | B25B 23/1475 173/132 |
| 2012/0293096 | A1* | 11/2012 | Mizoguchi | H01M 10/48 318/139 |
| 2013/0032369 | A1* | 2/2013 | Dridger | G01S 5/16 173/2 |
| 2013/0076507 | A1* | 3/2013 | Petricoin, Jr. | H04N 7/14 340/539.11 |
| 2013/0127262 | A1* | 5/2013 | Roser | H02H 1/0007 307/326 |
| 2013/0141587 | A1* | 6/2013 | Petricoin, Jr. | G07C 9/28 348/156 |
| 2013/0186661 | A1* | 7/2013 | Okubo | B25D 11/005 173/2 |
| 2014/0089864 | A1* | 3/2014 | Cheng | G06F 3/017 715/863 |
| 2014/0166323 | A1* | 6/2014 | Cooper | F16P 3/148 173/1 |
| 2014/0166324 | A1* | 6/2014 | Puzio | B25F 5/001 173/20 |
| 2014/0284070 | A1* | 9/2014 | Ng | B25F 5/02 173/2 |
| 2014/0375581 | A1* | 12/2014 | Arai | G06F 3/0488 345/173 |
| 2015/0161836 | A1* | 6/2015 | Park | B60R 25/2045 340/5.51 |
| 2015/0272574 | A1* | 10/2015 | Leimbach | A61B 17/068 713/323 |
| 2016/0020443 | A1* | 1/2016 | White | B25F 5/00 318/245 |
| 2016/0116592 | A1* | 4/2016 | Hiromi | G01S 7/4918 345/156 |
| 2017/0008159 | A1* | 1/2017 | Boeck | G05B 19/00 |
| 2019/0020498 | A1* | 1/2019 | Ye | H04L 12/2829 |

FOREIGN PATENT DOCUMENTS

| | | |
|---|---|---|
| CN | 101027166 A | 8/2007 |
| CN | 101236411 A | 8/2008 |
| CN | 201167306 Y | 12/2008 |
| CN | 102528770 A | 7/2012 |
| CN | 202463586 U | 10/2012 |
| CN | 103068529 A | 4/2013 |
| CN | 104249351 A | 12/2014 |
| DE | 102009047443 A1 | 6/2011 |
| EP | 2671681 A2 | 12/2013 |

* cited by examiner

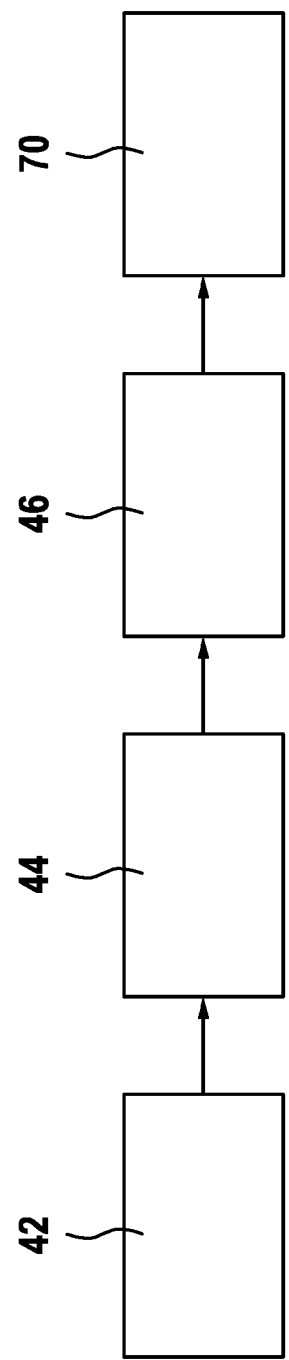

HAND-HELD POWER TOOL

This application is a divisional of copending U.S. application Ser. No. 15/349,013, filed on Nov. 11, 2016, which claims the benefit of priority under 35 U.S.C. § 119 to application no. DE 10 2015 222 152.0, filed on Nov. 11, 2015 in Germany, the disclosures of which are incorporated herein by reference in their entirety.

BACKGROUND

Hand-held power tools, in particular with an SDSplus® tool holder which comprise a switch-locking unit have already been proposed.

SUMMARY

The disclosure is based on a hand-held power tool having at least one switch device which comprises at least one switching element, at least for activating a power supply of a drive unit, having at least one quick-change tool holder which is provided for holding an insertion tool which is different from an insertion tool with an SDS® shaft having a maximum transverse extent of 10 mm and/or having at least one accumulator interface.

It is proposed that the at least one switching device comprises at least one locking unit which is provided for maintaining, at least essentially independently of an effect of an operator activation force, an active operating mode which can be activated by actuating the at least one switching element.

A "hand-held power tool" is intended in this context to refer, in particular, to a portable machine which can process workpieces and is advantageously a drilling machine, a hammer drill and/or percussion hammer, a saw, a plane, a screwdriver, a milling machine, a grinding machine, an angle grinder, a garden implement and/or a multi-functional tool, which can be transported by an operator in order to process workpieces without the need for a transportation machine. The hand-held power tool has, in particular, a mass which is less than 40 kg, preferably less than 10 kg and particularly preferably less than 5 kg. A "switching element" is to be understood in this context as referring, in particular, to an element or an assembly which is provided to be actuated directly at least partially by an operator of the hand-held power tool and which is provided to form and/or disconnect an electrically conductive connection between at least two points, in particular between at least two switching contacts of the switching unit. The at least one switching unit is preferably formed at least partially as an electronic, mechanical and/or electromechanical switching unit which comprises, in particular, at least one relay.

A "drive unit" is to be understood in this context as referring, in particular, to a unit which is provided for generating at least one driving torque and for making it available to be passed on, in particular, to an insertion tool. The drive unit preferably comprises an electric motor. A "quick-change tool holder" is to be understood in this context as referring, in particular, to a tool holder for detachably fastening an insertion tool to the hand-held power tool which is designed to be capable of being operated in a tool-less fashion. The quick-change tool holder is preferably provided for holding an insertion tool having a shaft which is associated with an insertion system, in particular having an SDS-max® shaft. However, other embodiments of the insertion tool shaft associated with an insertion system, which appear to be appropriate to a person skilled in the art are conceivable, these embodiments being, for example, a round shaft, a square shaft, hexagonal shaft or an HEX shaft. The term SDS® is a registered trade mark of Robert Bosch GmbH (registration number DE 396086497). The term "transverse extent" is to be understood in this context as referring, in particular, to a dimension of the shaft of the insertion tool in a plane which is arranged perpendicularly with respect to a longitudinal direction of the insertion tool. A "shaft" is to be understood in this context as referring, in particular, to a part of the insertion tool which is embodied so as to be at least essentially, preferably completely, free of a processing geometry, in particular of a cutting geometry. The shaft of the insertion tool is preferably provided for coupling the insertion tool to the tool holder of the hand-held power tool.

The term "accumulator interface" is to be understood in this context as referring, in particular, to a unit of the hand-held power tool which is provided for electrically, and preferably in addition at least partially mechanically, coupling the hand-held power tool to at least one accumulator, in particular to at least one hand-held power tool accumulator pack. In a state in which the accumulator is coupled to the accumulator interface it is provided to supply the hand-held power tool with an operating voltage for operating at least the drive unit of the hand-held power tool.

The locking unit is preferably embodied at least partially in a mechanical and/or electric or electronic fashion. The locking unit is preferably provided for mechanically locking the at least one switching element. However, it is also conceivable for the locking unit to be provided to maintain the active operating mode electronically, preferably independently of a position of the at least one switching element of the switching device, in particular by means of an open- and/or closed-loop control unit. In this context, the open-loop and/or closed-loop control unit can be formed at least partially by an open-loop and/or closed-loop control unit for performing open-loop and/or closed-loop control of the hand-held power tool or can be embodied separately from the open-loop and/or closed-loop control unit for performing open-loop and/or closed-loop control of the hand-held power tool. The locking unit preferably comprises at least one locking element which is provided for activating the maintaining of the active operating mode. The at least one locking unit can advantageously be embodied as an actuating element for actuation by an operator, in particular as an HMI (human machine interface) and/or in some other way which appears appropriate to a person skilled in the art. The locking unit is preferably at least partially arranged in the region of the at least one switching element of the switching device. The locking unit is preferably provided for maintaining the active operating mode in a chronologically unlimited fashion, in particular up to an active deactivation of the active operating mode by an operator of the hand-held power tool and/or by means of at least one switch-off signal of an open- and/or closed-loop control unit. The deactivation by the operator can be carried out, for example, by means of at least one switch-off element of the hand-held power tool which can be actuated by the operator. The at least one switch-off element can preferably be embodied at least partially integrally with the at least one switching element of the switching unit. The term an "open-loop and/or closed-loop control unit" is to be understood in this context as referring, in particular, to a control unit having at least one open-loop control electronics which comprises, in particular, at least one processor unit and a memory unit as well an operating program which can be stored in the memory unit.

The embodiment of the hand-held power tool according to the disclosure can, in particular in the case of a relatively long-lasting working process, advantageously facilitate handling of the hand-held power tool and permit preferably good working ergonomy for the operator and particularly efficient working progress. In particular, an advantage in terms of ergonomy for network-bound hand-held power tools can be obtained. In addition, the locking unit can permit a gripping position to be changed without interruption of the process. This can advantageously permit fatigue-free or low-fatigue working by the operator with the hand-held power tool, in particular in the case of balancing and/or agitating.

If the hand-held power tool also comprises at least one double-sided additional handle, the hand-held power tool can preferably additionally be used, for example, as a ground boring device, as result of which a field of application of the hand-held power tool can be advantageously extended.

In addition, it is proposed that the at least one locking unit has at least one timer function which is provided for at least partially automatically triggering the maintaining of an active operating mode as a function of an actuation period of the switching element. The timer function is provided, in particular, for automatically triggering the maintaining of an active operating mode after 5 seconds, preferably after 10 seconds and particularly preferably after 20 seconds of uninterrupted actuation of the switching element by the operator. However, other time periods which appear appropriate to a person skilled in the art are also conceivable. The term "automatic" is to be understood in this context as meaning, in particular, at least virtually and preferably completely independently of an active intervention by the operator. The timer function is preferably made available at least partially by control electronics. As result, advantageously simple and preferably operator-friendly configuration of the at least one locking unit can be achieved.

In addition, it is proposed that the at least one locking unit comprises at least one acoustic pick-up element which is provided at least for picking up at least one acoustic characteristic variable, wherein the locking unit is provided for performing open-loop and/or closed-loop control of the maintaining of an active operating mode as a function of the at least one picked up acoustic characteristic variable. An "acoustic characteristic variable" is to be understood in this context as referring, in particular, to at least one sound signal which is preferably in the frequency range between 16 Hz to 20 kHz which can be heard by humans and which is provided for transmitting at least one item of information. The acoustic characteristic variable is preferably formed from a speech command of the operator. The at least one acoustic pick-up element is preferably formed from at least partially by a microphone. As result, advantageously simple operation of the at least one locking element, in particular by a voice-activated controller, can be achieved.

Furthermore, it is proposed that the at least one locking unit comprises at least one pick-up element for picking up a movement characteristic variable of an operator, wherein the locking element is provided for performing open-loop and/or closed-loop control of the maintaining of an active operating mode as a function of the at least one picked up movement characteristic variable. A "movement characteristic variable" is to be understood in this context as referring, in particular, to at least one movement, in particular of the operator, preferably a hand movement of the operator which is provided at least for conveying at least one item of information. The movement characteristic variable is preferably formed by a gesture of the operator. The at least one pick-up element is preferably formed at least partially by a camera. As a result, an advantageously simple operator control process of the at least one locking unit, in particular by means of gesture-based control, can be achieved.

In addition it is proposed that the hand-held power tool comprises at least one sensor unit at least for picking up at least one safety characteristic variable in order to pick up a fault, wherein the locking unit is provided for automatically switching off the drive unit as a function of the picked up safety characteristic variable or for reducing a rotational speed and/or a power level of the drive unit. A "sensor unit" is to be understood as meaning, in particular, a unit which is provided for recording at least one physical property, wherein the recording can take place actively such as, in particular, by generating and emitting an electrical measurement signal, and/or passively, such as, in particular, by picking up changes in properties of a sensor component. Various sensor units which appear appropriate to a person skilled in the art are conceivable. The sensor unit can preferably comprise at least one sensor element which can be embodied, for example, as an acceleration sensor, position sensor, gyroscope, temperature sensor and/or in some other way which appears appropriate to a person skilled in the art. Alternatively or additionally, the at least one sensor element can also be embodied as a moisture sensor and/or conductivity sensor, in particular in a handle of the hand-held power tool, in order to detect that the hand-held power tool is being held in an operator's hand, in order to deactivate the maintaining of the active operating mode when the operator lets go of the tool.

A "safety characteristic variable" is to be understood in this context as meaning, in particular, a value of a physical property which is relevant at least to safe operation of the hand-held power tool, which operation is at least free of injury for an operator and at least partially free of damage for the hand-held power tool. The safety characteristic variable is preferably embodied as acceleration, temperature, in particular of the drive unit and/or of a percussion mechanism and/or as some other physical parameter which appears appropriate to a person skilled in the art. The at least one sensor unit preferably comprises at least one acceleration sensor for picking up blocking and/or dropping or a free fall of the hand-held power tool, at least one current sensor for picking up blocking on the basis of high currents, at least one temperature sensor for picking up overheating of a drive unit and/or the percussion mechanism of the hand-held power tool and/or at least one other sensor which appears appropriate to a person skilled in the art.

As result, a preferably high level of safety can be achieved for the operator and/or for the hand-held power tool in an advantageously reliable way. In particular, a risk of injury in the event of blocking of an insertion tool during a drilling operation, during which the hand-held power tool would rotate in an uncontrolled fashion about a machining axis in an active operating mode can be advantageously reduced. In particular, in the case of a hand-held power tool with an accumulator interface, the hand-held power tool could, in the event of blocking in a locked state of the active operating mode without a protection mechanism which the sensor unit makes available only be deactivated by removing a hand-held power tool accumulator pack, which would constitute a large risk for the operator of the hand-held power tool.

In addition it is proposed that the hand-held power tool has at least one sensor unit which has at least one pressure sensor for picking up at least one pressing force, wherein the locking unit is provided for maintaining of an active operating mode as a function of the picked up pressing force. A "pressing force" is to be understood in this context as meaning, in particular, a force with which an insertion tool which is coupled to the hand-held power tool is pressed in an operating state by the operator against a workpiece which is to be machined. The pressing sensor can preferably be coupled to a dead man's switch. The pressing force detected by the pressure sensor is advantageously interrogated continuously and without interruption. As result the hand-held power tool can preferably be prevented from being put down in an active operating mode.

Furthermore, it is proposed that the hand-held power tool comprises at least one percussion mechanism and at least one sensor unit, wherein the at least one sensor unit comprises at least one frequency sensor which is provided for picking up an impact frequency of the percussion mechanism, wherein the locking unit is provided for performing open-loop and/or closed-loop control of the maintaining of an active operating mode as a function of the picked up impact frequency. In this context, "percussion mechanism" is to be understood as meaning, in particular, a unit which is provided for translating a rotational drive movement of the drive unit of the hand-held power tool at least partially into a linear movement of an impacting element of the percussion mechanism in order to transmit at least one impact pulse to the insertion tool coupled to the hand-held power tool. In this context, "impact frequency" is to be understood as meaning, in particular, a frequency of a periodic linear movement of the impact element of the percussion mechanism in at least one operating state. As result, operation of the hand-held power tool with idle strokes of the percussion mechanism can preferably be prevented.

In addition, it is proposed that the hand-held power tool comprises at least one communication unit for communicating with at least one external device, wherein the at least one locking unit is provided for performing open-loop and/or closed-loop control of the maintaining of an active operating mode as a function of a communication between the at least one communication unit and the at least one external device. The at least one external device is preferably formed by a Smartphone, a table, a cloud and/or some other, in particular, electrical or electronic device which appears appropriate to a person skilled in the art. A "communication" is to be understood in this context as meaning, in particular, an at least unidirectional, preferably bidirectional, exchange of data and/or information at least between the at least one external device and the at least one communication unit. The operator can preferably at least partially operate the at least one locking unit via the at least one communication unit by means of the at least one external device. The communication between the at least one external device and the at least communication unit can preferably be carried out via a wireless link, for example by means of radio, WLAN, Bluetooth, IR and/or by means of some other wireless link which appears appropriate to a person skilled in the art. However, a connection of the at least one external device to the at least one communication unit via a cable is also conceivable. The communication unit can additionally be provided for the purpose of wireless coupling of at least the locking unit and the sensor unit and/or of further components and/or assemblies which appear appropriate to a person skilled in the art. As result, preferably flexible and operator-friendly operation of the locking unit of the hand-held power tool can be achieved.

In addition, a method is proposed for operating the hand-held power tool according to the disclosure having at least one method step in which an operator activates an active operating mode by actuating at least one switching element, and having at least one further method step in which at least one locking unit maintains the active operating mode independently of the actuation of the at least one switching element by the operator. As a result, particularly good relief for the operator and particularly efficient working progress can be achieved in an advantageously simple way, in particular in the case of a relatively long lasting working process.

Furthermore, it is proposed that the method have at least one further method step in which a fault is picked up and automatic deactivation of the active operating mode which is maintained by means of the locking unit is carried out as a function of the picked up fault. A "fault" is to be understood in this context as meaning, in particular, that a predefined critical limiting value of at least one safety characteristic variable of the hand-held power tool, in particular in an active state, is reached or exceeded. As result, a preferably high level of safety for the operator and/or for the hand-held power tool can be achieved in a particularly reliable fashion.

The hand-held power tool according to the disclosure is not intended here to be restricted to the application and embodiment described above. In particular, the hand-held power tool according to the disclosure can have, for the purpose of carrying out a method of functioning as described here, a number of individual elements, components and units which differs from the number specified here. In addition, in the case of the value ranges which are specified in this disclosure the values which also lie within the specified limits are also to be considered as being disclosed and as being capable of being used as desired.

BRIEF DESCRIPTION OF THE DRAWINGS

Further advantages can be found in the following description of the drawings. The drawings illustrate a plurality of exemplary embodiments of the disclosure. The drawings and the description contain numerous features in combination. A person skilled in the art will also expediently consider the features individually and combine them to form appropriate further combinations.

In the drawings:

FIG. 9 shows a flowchart of a method relating to operation of the hand-held power tool according to the disclosure.

DETAILED DESCRIPTION

Figure 1:
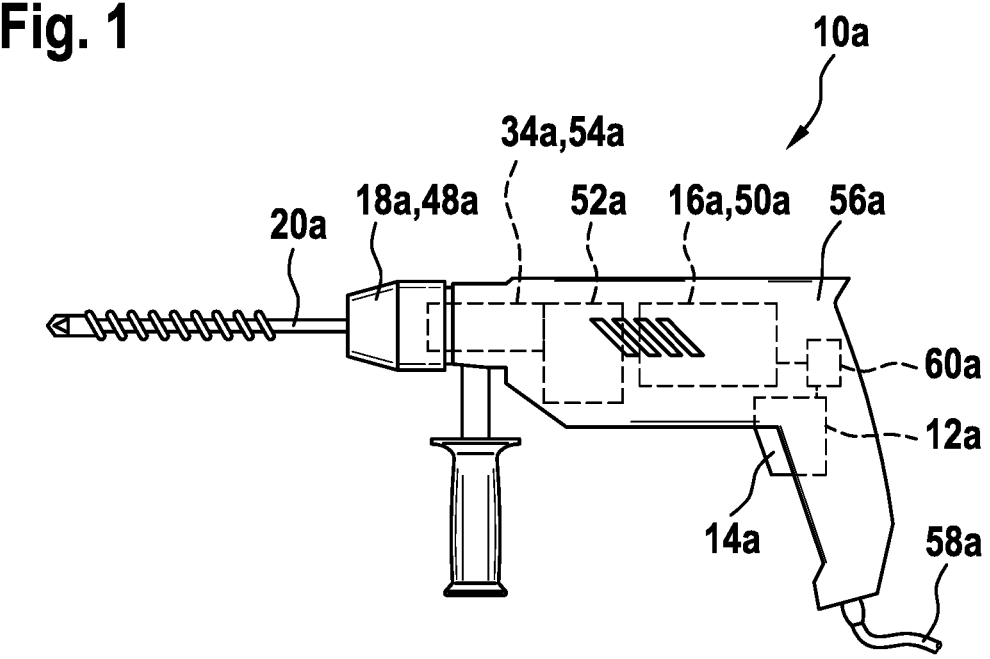
FIG. 1 shows a hand-held power tool according to the disclosure in a schematic side view.

FIG. 1 shows a hand-held power tool 10a having a tool holder 48a. The hand-held power tool 10a is formed by a hammer drill. However, other configurations of the hand-held power tool 10a which appear to be appropriate to a person skilled in the art, such as, for example, as a hammer drill, drilling machine, hand-held jigsaw, hand-held circular saw or angle grinder are conceivable. The tool holder 48a is provided for holding an insertion tool 20a, which can be embodied as a drill and/or chisel. The tool holder 48a is formed by a quick-change tool holder 18a. The quick-change tool holder 18a is provided for holding the insertion tool 20a which is different from an insertion tool with an SDS® shaft with a maximum transverse extent of 10 mm. The quick-change tool holder 18a is provided for holding the insertion tool 20a which has an SDSmax® shaft. The quick-change tool holder 18a is embodied as an SDSmax® quick-change tool holder. However, other configurations of the quick-change tool holder 18a or of the shaft of the insertion tool 20a which appear appropriate to a person skilled in the art, such as, for example as part of an HEX quick-change system are conceivable, wherein a transverse extent of the shaft is, in particular, at least 20 mm and at maximum 50 mm.

Furthermore, the hand-held power tool 10a has at least one drive unit 16a. The hand-held power tool 10a has a drive unit 16a which comprises an electric motor 50a. In addition, the hand-held power tool 10a has a transmission unit 52a. The transmission unit 52a has here a switch-over unit (not illustrated in more detail) which is provided for switching over between a rotating power take off, percussion power take off and rotating and percussion power take off (not illustrated in detail). A torque which is generated by the electric motor 50a of the drive unit 16a is converted by the transmission unit 52a into an operating function which is illustrated by an operator, and is conducted to a power take off device 54a, which has a percussion mechanism 34a. The power take off device 54a is connected directly to the tool holder 48a. The electric motor 50a, the transmission unit 52a and the power take off device 54a are enclosed by two housing shells 56a of the hand-held power tool 10a. Basically, configurations in which the units are arranged in two or more pot-like housing parts are also conceivable. The hand-held power tool 10a also comprises a power cable 58a which is provided for connecting the hand-held power tool 10a to a power network, and for supplying the hand-held power tool 10a with electrical energy.

Figure 2:
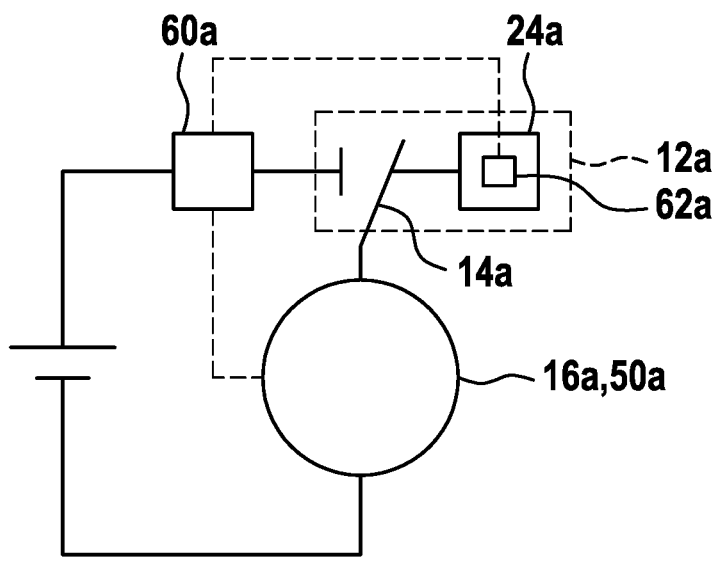
FIG. 2 shows a schematic illustration of a circuit of the hand-held power tool.

The hand-held power tool 10a additionally has at least one switch device 12a which comprises at least one switching element 14a at least for activating a power supply of the drive unit 16a (FIG. 2). The hand-held power tool 10a has a switch device 12a which comprises a switching element 14a for activating the electric motor 50a of the drive unit 16a. The switching element 14a is embodied as a mechanical switching element. The switching element 14a is formed by a push button. However, other configurations of the switching element 14a which appear appropriate to a person skilled in the art, such as, for example, at least partially as an electronic switching element or as a touchpad, are conceivable. The switching element 14a is provided for closing at least one electrical contact of a circuit for activating the power supply of the drive unit 16a. The switching element 14a is embodied so as to be directly actuable by an operator.

In order to activate the electric motor 50a of the drive unit 16a, the operator of the hand-held power tool 10a presses the switching element 14a and therefore places the hand-held power tool 10a in an active operating mode. In order to maintain this active operating mode, the operator keeps the switching element 14a pressed.

The switching element 12a also comprises at least one locking unit 24a which is provided at least essentially independently of an effect of an operator actuation force for maintaining the active operating mode, which mode can be activated by actuating the switching element 14a. The locking unit 24a is embodied as an electronic locking unit. The hand-held power tool 10a additionally has at least an open-loop and/or closed-loop control unit 60a which is provided for performing open-loop and/or closed-loop control of at least the electric motor 50 of the drive unit 16a. The locking unit 24a is electrically connected to the open-loop and/or closed-loop control unit 60a. The locking unit 24a is electrically connected to the drive unit 16a via the open-loop and/or closed-loop control unit 60a.

The locking unit 24a has at least one timer function which is provided for at least partially automatically triggering the maintaining of the active operating mode as a function of an actuation period of the switching element 14a. The locking unit 24a comprises at least one electronic timing element 62a which makes available the timer function. However, the at least one timing element 62a can also be embodied mechanically and/or in some other way which appears appropriate to a person skilled in the art. The timer function of the locking unit 24a is provided for automatically triggering the maintaining of the active operating mode after the actuation period of the switching element 14a of more than seconds by the operator. It is also conceivable that the timer function of the locking unit 24a is provided for already automatically triggering the maintaining of the active operating mode after the actuation period of the switching element 14a of more than seconds by the operator. Alternatively, it is also conceivable that the actuation period of the switching element 14a by the operator, which period is necessary for automatically triggering the maintaining of the active operating mode, is designed to be adjustable by the operator. After the operator keeps the switching element 14a pressed for at least seconds, the maintaining of the active operating mode is triggered automatically by means of the open-loop and/or closed-loop control unit 60a.

After the triggering of the maintaining of the active operating mode by the locking unit 24a, the operator can use the hand-held power tool 10a independently of actuation of the switching element 14a. In order to deactivate the maintaining of the active operating mode by the locking unit 24a, the operator presses, for example, the switching element 14a again. However, other configurations for deactivating the maintaining of the active operating mode by the locking unit 24a, which appear appropriate to a person skilled in the art, such as, for example, actuating an additional switch-off element, are also conceivable.

FIGS. 3 to 6 show further exemplary embodiments of the disclosure. The following descriptions and the drawings are limited essentially to the differences between the exemplary embodiments, wherein reference can basically also be made to the drawings and/or the description of the other exemplary embodiments, in particular of FIGS. 1 and 2, with respect to identically designated components, in particular with respect to components with the same reference symbols. In order to differentiate the exemplary embodiments, the letter a is appended to the reference numbers of the exemplary embodiment in FIGS. 1 and 2. The letter a is replaced by the letters b to d in the exemplary embodiments in FIGS. 3 to 6.

Figure 3:
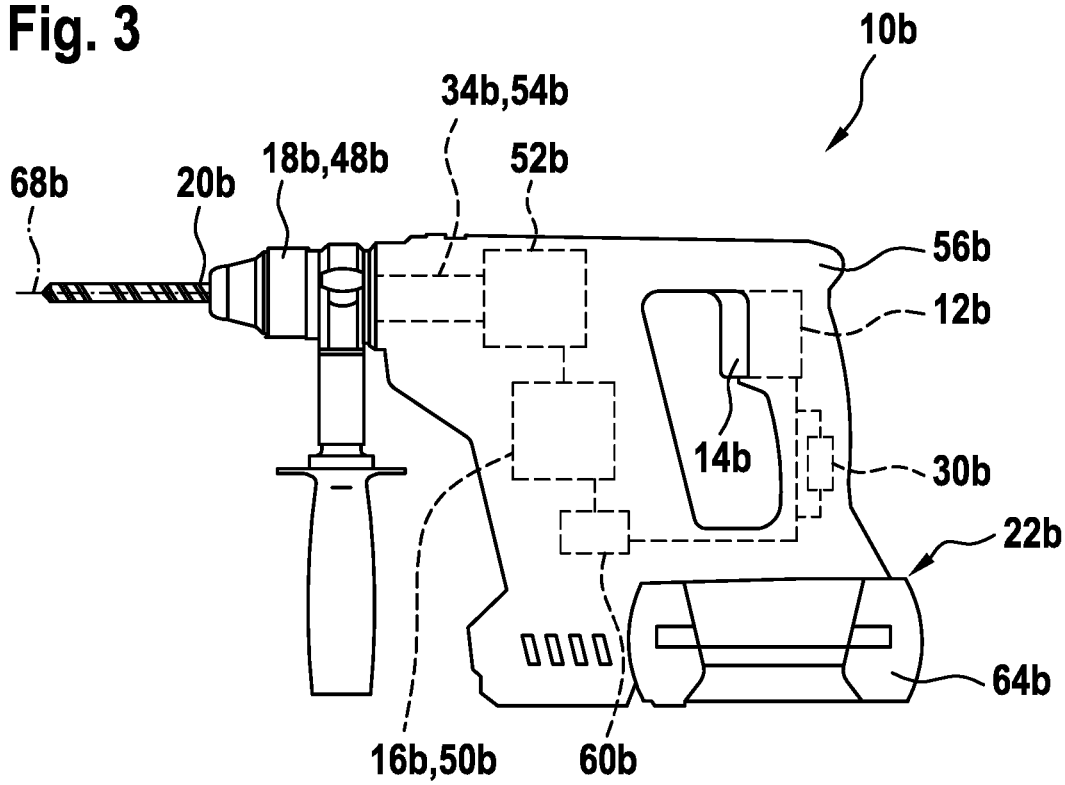
FIG. 3 shows an alternative configuration of a hand-held power tool according to the disclosure in a schematic side view.
Figure 4:
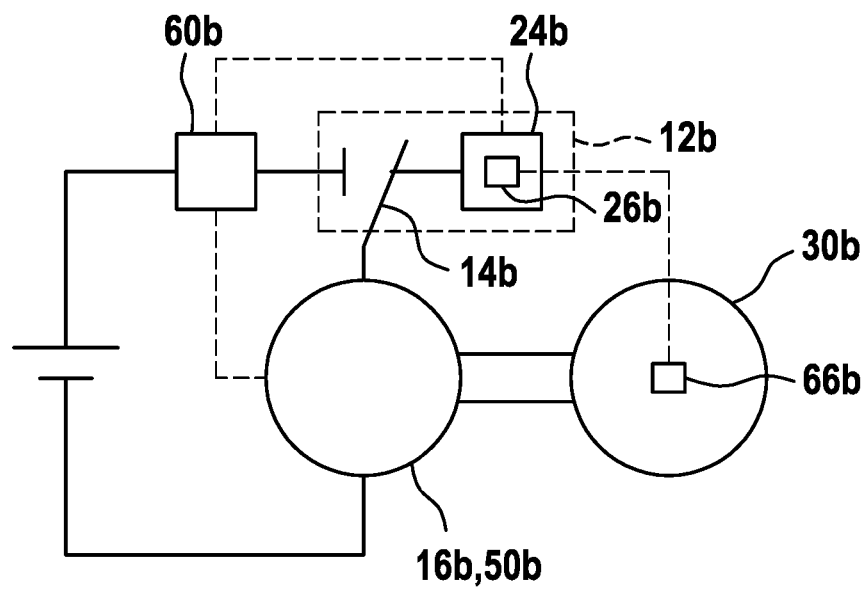
FIG. 4 shows a schematic illustration of a circuit of the hand-held power tool which is configured in an alternative fashion.

FIG. 3 shows an alternative hand-held power tool 10b. The hand-held power tool 10b is formed by a hammer drill. However, other configurations of the hand-held power tool 10b which appear appropriate to a person skilled in the art, such as, for example, an impact drill, drilling machine, hand-held jigsaw, hand-held circular saw or angle grinder. The hand-held power tool 10b has a tool holder 48b which is provided for holding an insertion tool 20b which can be embodied as a drill and/or chisel. The tool holder 48b is formed by a quick-change tool holder 18b. It is basically also conceivable for the tool holder 48b to be embodied, for example, as a drill chuck. The tool holder 48b corresponds at least essentially to the tool holder 48b already described. Furthermore, the hand-held power tool 10b has at least one drive unit 16b. The hand-held power tool 10b has a drive unit 16b which comprises an electric motor 50b and at least essentially corresponds to the drive unit 16a already described. In addition, the hand-held power tool 10b has a transmission unit 52b and a drive device 54b having a percussion mechanism 34b. The transmission unit 52b and the drive device 54b correspond to the transmission unit 52a already described and to the drive device 54a already described.

In order to supply the hand-held power tool 10b with electrical power, the hand-held power tool 10b has an accumulator interface 22b which is provided for coupling the hand-held power tool 10b to a hand-held power tool accumulator pack 64b. The accumulator interface 22b is provided for electrically and mechanically coupling the hand-held power tool accumulator pack 64b to the hand-held power tool 10b. The accumulator interface 22b of the hand-held power tool 10b is provided for replaceably attaching the hand-held power tool accumulator pack 64b. FIG. 3 shows the hand-held power tool 10b and the hand-held power tool accumulator pack 64b in a state in which it is coupled to the hand-held power tool 10b by means of the accumulator interface 22b.

The hand-held power tool 10b additionally has at least one switch device 12b which comprises at least one switching element 14b at least for activating a power supply of the drive unit 16. The hand-held power tool 10b has a switch device 12b which comprises a switching element 14b for activating the electric motor 50b of the drive unit 16b. The switch device 12b and the switching element 14b correspond to the switch device 12a already described and to the switching element 14a already described. In order to activate the electric motor 50b of the drive unit 16b, the operator of the hand-held power tool 10b presses the switching element 14b and therefore places the hand-held power tool 10b in an active operating mode. In order to maintain this active operating mode, the operator keeps the switching element 14b pressed.

The switch device 12b also comprises at least one locking unit 24b which is provided for maintaining the active operating mode at least essentially independently of an effect of an operator actuating force, which operating mode can be activated by actuating the switching element 14b. The locking unit 24b corresponds to the locking unit 24a already described. The locking unit 24b is embodied as an electronic locking unit. The hand-held power tool 10b additionally has at least one open-loop and/or closed-loop control unit 60b which is provided for performing open-loop and/or closed-loop control at least of the electric motor 50b of the drive unit 16b. The locking unit 24b is electrically connected to the open-loop and/or closed-loop control unit 60b. The locking unit 24b is electrically connected to the drive unit 16b via the open-loop and/or closed-loop control unit 60b.

The locking unit 24b comprises at least one acoustic pick-up element 26b which is provided at least for picking up at least one acoustic characteristic variable, wherein the locking unit 24b is provided for performing open-loop and/or closed-loop control of the maintaining of an active operating mode as a function of the at least one detected acoustic characteristic variable. The locking unit 24b comprises an acoustic pick-up element 26b. The acoustic pick-up element 26b is provided for picking up an acoustic characteristic variable. The acoustic pick-up element 26b is provided for picking up at least one voice command of the operator of the hand-held power tool 10b. The acoustic pick-up element 26b is embodied as a voice-recognition module. The operator of the electric hand-held power tool 10b can maintain the active operating state by means of a voice command which is picked up and detected by the acoustic pick-up element 26b. The acoustic pick-up element 26b is coupled to the open-loop and/or closed-loop control unit 60b and, after the picking up and recognition of the voice command of the operator of the hand-held power tool 10b, passes on an electrical signal to the open-loop and/or closed-loop control unit 60b. The open-loop and/or closed-loop control unit 60b activates the maintaining of the active operating mode as a function of this electrical signal. In order to deactivate the maintaining of the active operating mode, the operator of the hand-held power tool 10b outputs a further voice command which is picked up and detected by the acoustic pick-up element 26b. Alternatively or additionally, manual deactivation of the maintaining of the active operating mode is also conceivable, for example, by means of a deactivation switching element.

The hand-held power tool 10b also has at least one sensor unit 30b which is provided at least for picking up at least one safety characteristic variable for picking up a fault, wherein the locking unit 24b is provided for automatically switching off the drive unit 16b as a function of the picked-up safety characteristic variable or for reducing a rotational speed and/or a power of the drive unit 16b. The hand-held power tool 10b comprises a sensor unit 30b for picking up at least one safety characteristic variable for picking up the fault. The sensor unit 30b comprises at least one sensor element 66b which is provided for picking up the safety characteristic variable. The sensor element 66b is formed via an acceleration sensor. The safety characteristic variable is formed by an acceleration of the hand-held power tool 10b about a machining axis 68b of the insertion tool 20b of the hand-held power tool 10b. If the value of the safety characteristic variable reaches or exceeds a defined limiting value, the sensor unit 30b detects a fault. The fault is caused, for example, by the insertion tool 20b becoming stuck in an active operating state in a workpiece and becoming blocked, as a result of which, the hand-held power tool 10b is accelerated in an uncontrolled fashion about the machining axis 68b of the insertion tool 20b. The sensor unit 30b is coupled to the locking unit 24b and, after the detection of the fault, passes on an electrical signal to the locking unit 24b. The locking unit 24b is provided for switching off the drive unit 16b as a function of the electrical signal, independently of activated maintaining of the active operating state. It is also conceivable that a first limiting value of the safety characteristic variable is defined, the reaching or exceeding of the value of which safety characteristic variable causes the rotational speed or the power of the drive unit 16b to be reduced, and in that additionally a further limiting value of the safety characteristic variable is defined, the reaching or exceeding of which safety characteristic variable causes the rotational speed or the power of the drive unit 16*b* to be switched off. The further limiting value of the safety characteristic variable is higher here than the first limiting value of the safety characteristic variable.

Figure 5:
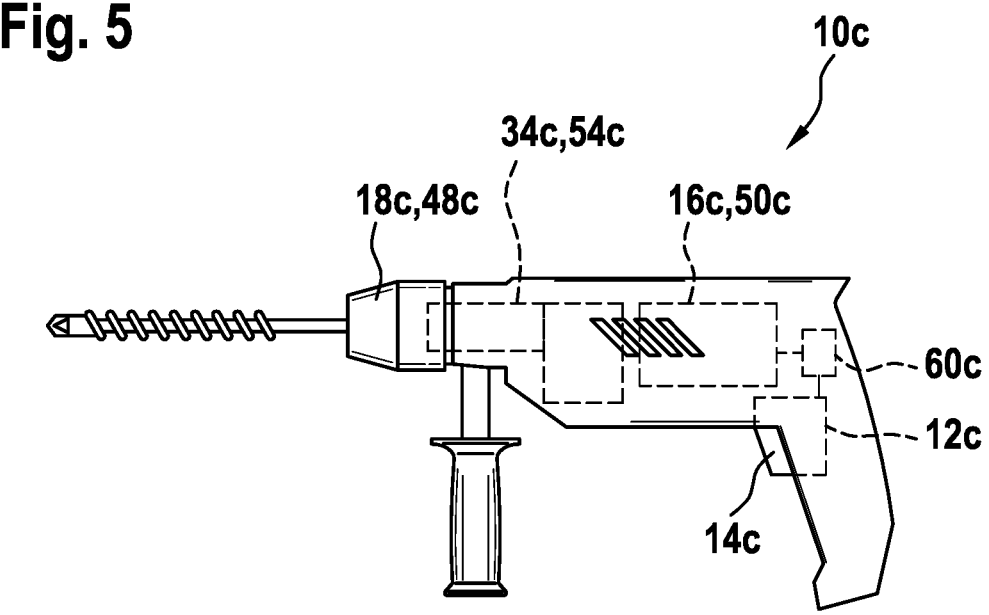
FIG. 5 shows a further alternative configuration of a hand-held power tool according to the disclosure in a schematic side view.
Figure 6:
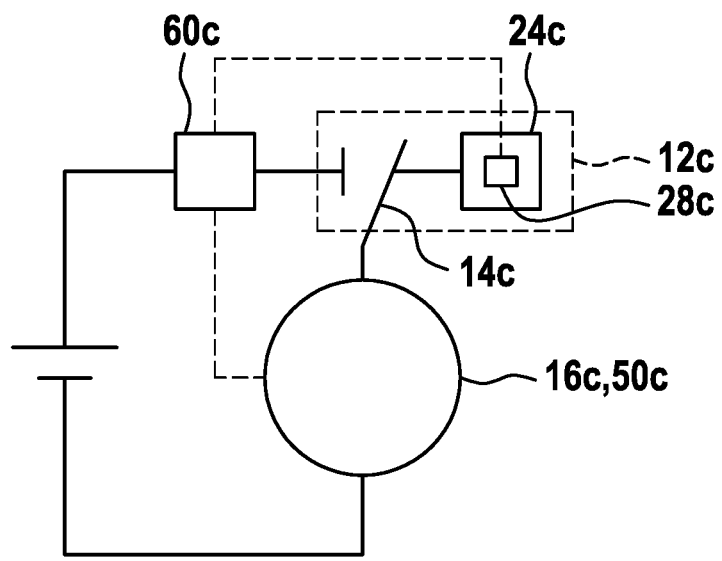
FIG. 6 shows a schematic illustration of a circuit, configured in an alternative fashion, of the hand-held power tool which is configured in an alternative fashion.

FIGS. 5 and 6 are schematic illustrations of a further embodiment of a hand-held power tool 10*c* and of a circuit of the hand-held power tool 10*c*. The hand-held power tool 10*c* corresponds to the hand-held power tool 10*a* which has already been described, and comprises a tool holder 48*c* which is embodied as a quick-change tool holder 18*c*. The hand-held power tool 10*c* has a drive device 54*c* with a percussion mechanism 34*c* which corresponds to the percussion mechanism 34*a* already described. The hand-held power tool 10*c* has at least one switch device 12*c* which comprises at least one switching element 14*c* at least for activating a power supply of a drive unit 16*c*. The hand-held power tool 10*c* has a switch device 12*c* which comprises a switching element 14*c* for activating an electric motor 50*c* of the drive unit 16*c*. The switch device 12*c* and the switching element 14*c* correspond to the switch device 12*a* already described and to the switching element 14*a* already described. In order to activate the electric motor 50*c* of the drive unit 16*c*, the operator of the hand-held power tool 10*c* presses the switching element 14*c* and therefore places the hand-held power tool 10*c* in an active operating mode. In order to maintain this active operating mode, the operator keeps the switching element 14*c* pressed.

The switch device 12*c* also comprises at least one locking unit 24*c* which is provided at least essentially independently of an effect of an operator actuating force for maintaining the active operating mode which can be activated by actuating the switching element 14*c*. The locking unit 24*c* corresponds to the locking unit 24*a* which has already been described. The locking unit 24*c* is embodied as an electronic locking unit. The hand-held power tool 10*c* also has at least one open-loop and/or closed-loop control unit 60*c* which is provided for performing open-loop and/or closed-loop control of at least the electric motor 50*c* of the drive unit 16*c*. The locking unit 24*c* is electrically connected to the open-loop and/or closed-loop control unit 60*c*. The locking unit 24*c* is electrically connected to the drive unit 16*c* via the open-loop and/or closed-loop control unit 60*c*. The locking unit 24*c* has at least one pick-up element 28*c* for picking up a movement characteristic variable of the operator, wherein the locking unit 24*c* is provided for performing open-loop and/or closed-loop control of the maintaining of an active operating mode as a function of the at least one picked-up movement characteristic variable. The locking unit 24*c* has the pick-up element 28*c* for picking up a movement characteristic variable of the operator of the hand-held power tool 10*c*. The locking unit 24*c* is provided for performing open-loop and/or closed-loop control of the maintaining of the active operating mode as a function of the picked-up movement characteristic variable. The pick-up element 28*c* is at least provided for optically picking up the movement characteristic variable of the operator. The pick-up element 28*c* is at least partially formed by a camera. The pick-up element 28*c* is provided for picking up and evaluating the movement characteristic variable of the operator. The operator of the hand-held power tool 10*c* can maintain the active operating state by means of a gesture, for example a movement of the hand, which is picked up and recognized by the pick-up element 28*c*. The pick-up element 28*c* is coupled to the open-loop and/or closed-loop control unit 60*c* and, after the picking up and recognition of the gesture of the operator of the hand-held power tool 10*c*, passes on an electrical signal to the open-loop and/or closed-loop control unit 60*c*. The open-loop and/or closed-loop control unit 60*c* activates the maintaining of the active operating mode as a function of this electrical signal. In order to deactivate the maintaining of the active operating mode, the operator of the hand-held power tool 10*c* carries out a further gesture which is picked up and detected by the pick-up element 28*c*. Alternatively or additionally, manual deactivation of the maintaining of the active operator is conceivable, for example by means of a deactivation switching element.

Figure 7:
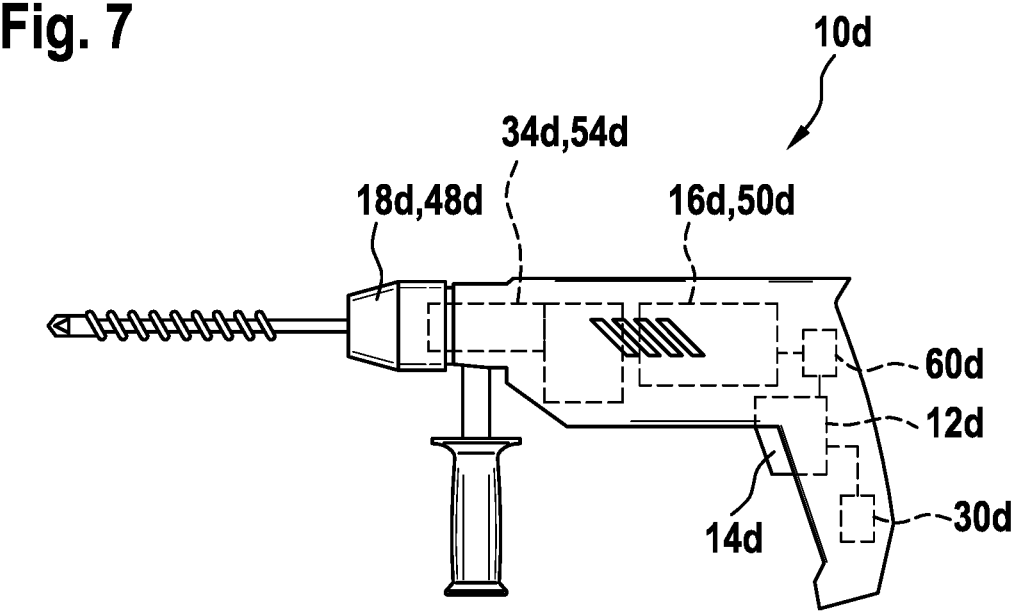
FIG. 7 shows a further alternative configuration of a hand-held power tool according to the disclosure in a schematic side view.
Figure 8:
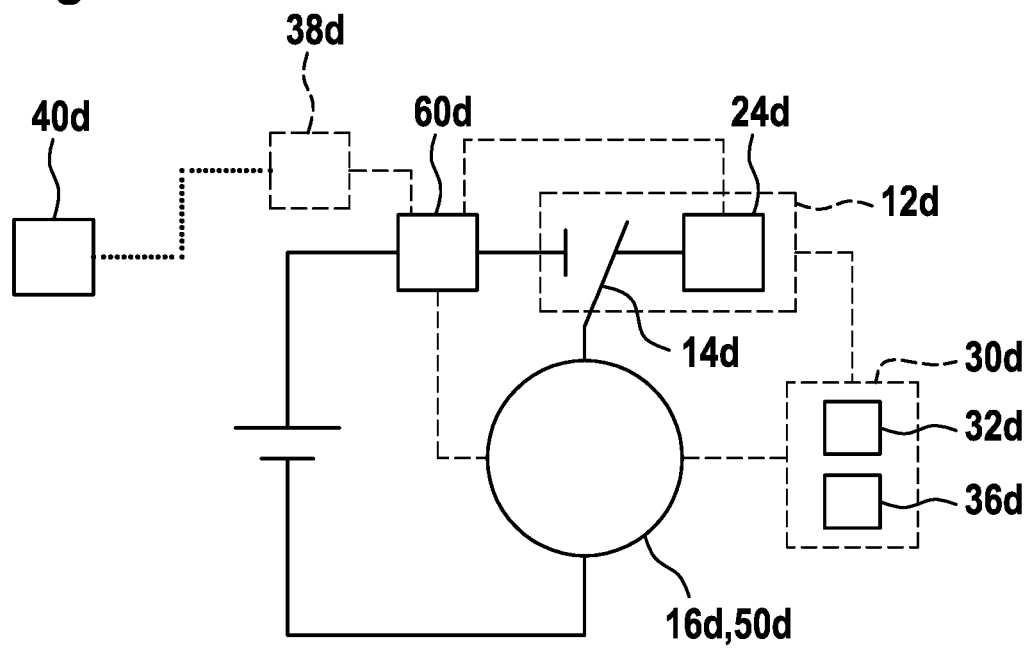
FIG. 8 shows a schematic illustration of a further circuit, configured in an alternative fashion of the hand-held power tool which is configured in an alternative fashion.

FIGS. 7 and 8 are a schematic illustration of a further exemplary embodiment of a hand-held power tool 10*d* and of a circuit of the hand-held power tool 10*d*. The hand-held power tool 10*d* corresponds to the hand-held power tool 10*a* already described and comprises a tool holder 48*d* which is embodied as a quick-change tool holder 18*d*. The hand-held power tool 10*d* has a power take-off device 54*d* with a percussion mechanism 34*d* which corresponds to the percussion mechanism 34*a* which has already been described. The hand-held power tool 10*d* has at least one switch device 12*d* which comprises at least one switching element 14*d* at least for activating a power supply of a drive unit 16*d*. The hand-held power tool 10*d* has a switch device 12*d* which comprises a switching element 14*d* for activating an electric motor 50*d* of the drive unit 16*d*. The switch device 12*d* and the switching element 14*d* correspond to the switch device 12*a* already described and to the switching element 14*a* already described. In order to activate the electric motor 50*d* of the drive unit 16*d*, the operator of the hand-held power tool 10*d* presses the switching element 14*d* and therefore places the hand-held power tool 10*d* in an active operating mode. In order to maintain this active operating mode, the operator keeps the switching element 14*d* pressed.

The switching device 12*d* also comprises at least one locking unit 24*d* which is provided for maintaining the active operating mode at least essentially independently of an effect of an operator actuating force, which operating mode can be activated by actuating the switching element 14*d*. The locking unit 24*d* corresponds to the locking unit 24*a* already described. The locking unit 24*d* is embodied as an electronic locking unit. The hand-held power tool 10*d* also has at least one open-loop and/or closed-loop control unit 60*d* which is provided for performing open-loop and/or closed-loop control at least of the electric motor 50*d* of the drive unit 16*d*. The locking unit 24*d* is electrically connected to the open-loop and/or closed-loop control unit 60*d*. The locking unit 24*d* is electrically connected to the drive unit 16*d* via the open-loop and/or closed-loop control unit 60*d*.

The hand-held power tool 10*d* also comprises at least one sensor unit which has at least one pressure sensor 32*d* for picking up at least one pressing force, wherein the locking unit 24*d* is provided for maintaining an active operating mode as a function of the picked-up pressing force. The hand-held power tool 10*d* comprises a sensor unit 30*d*. The sensor unit 30*d* has a pressure sensor 32*d* for picking up a pressing force. The pressure sensor 32*d* is formed by a force pick-up. The pressure sensor 32*d* is formed by piezo-force pick-up. However, other configurations of the pressure sensor 32*d* which appear appropriate to a person skilled in the art, such as, for example, a spring body force pick-up, are conceivable. When a workpiece is machined, the operator presses, with the pressing force, the hand-held power tool 10*d* with an insertion tool against the workpiece along a machining axis of the insertion tool. If a value of the pressing force reaches or exceeds a predefined limiting value, the sensor unit 30*d* passes on an electrical signal to the locking unit 24d, by means of which electrical signal activation of the active operating state is enabled. Activation of the active operating state is possible only if a value of the pressing force reaches or exceeds the defined limiting value and the electrical signal is passed on to the locking unit 24d. If the value of the pressing force drops below the defined limiting value in an active operating state which is maintained by means of the locking unit 24d, the maintaining of the active operating state is interrupted. The maintaining of the active operating state is interrupted if the value of the pressing force drops below the defined limiting value over a time period of 10 seconds. However, other time periods which appear appropriate to a person skilled in the art or a time period which can be set and varied by a person skilled in the art are also conceivable. As result it is possible to ensure that the hand-held power tool 10d is automatically switched off after being put down in an active operating state by the operator.

The sensor unit 30d of the hand-held power tool 10d additionally comprises at least one frequency sensor 36d which is provided for picking up an impact frequency of the percussion mechanism 34d, wherein the locking unit 24d is provided for performing open-loop and/or closed-loop control of the maintaining of the active operating mode as a function of the picked-up impact frequency. The sensor unit 30d comprises a frequency sensor 36d for picking up the impact frequency of the percussion mechanism 34d. The frequency sensor 36d is embodied as an acceleration sensor or in some other way which appears appropriate to a person skilled in the art. The frequency sensor 36d is provided for picking up an idle stroke of the percussion mechanism 34d in an active operating state. If the frequency sensor 36d picks up a plurality of successive idle strokes of the percussion mechanism 34d while the maintaining of the active operating state is activated by the locking unit 24d, the maintaining of the active state is interrupted. The maintaining of the active operating state is interrupted after the picking up of 10 idle strokes. However, a different number of idle strokes which appears appropriate to a person skilled in the art or a number of idle strokes which can be set and varied by the operator is also conceivable.

The hand-held power tool 10d also comprises at least one communication unit 38d for communicating with an external device 40d, wherein the locking unit 24d is provided for performing open-loop and/or closed-loop control of the active operating mode as a function of a communication between the communication unit 38d and the external device 40d. The hand-held power tool 10d has the communication unit 38d for communicating with the external device 40d. The external device 40d is formed by a Smartphone or a table. However, other configurations of the external device 40d which appear appropriate to a person skilled in the art are conceivable. The external device 40d and the communication unit 38d of the hand-held power tool 10d communicate with one another in a wireless fashion. The external device 40d and the communication unit 38d of the hand-held power tool 10d communicate with one another via WLAN. However, other configurations of the communication which appear appropriate to a person skilled in the art, such as, for example, via Bluetooth or infrared, are also conceivable. An app is installed in advance for this on the external device 40d. By means of a user interface of the app, the operator can control the locking unit 24d of the hand-held power tool 10d from the external device 40d. The communication unit 38d is electronically connected to the open-loop and/or closed-loop control unit 60d. The operator can therefore activate the maintaining of the active operating state of the held-held power tool 10d by means of the external device 40d. Alternatively or additionally, the operator can deactivate the maintaining of the active operating state by means of the external device 40d. In addition it is conceivable that the operator can use the external device 40d to set open-loop and/or closed-loop control variables of the hand-held power tool 10d, such as, for example, the number of idle strokes for the frequency sensor 36d, to set the time period for the pressure sensor 32c and/or at least one other characteristic variable which appears to be appropriate to a person skilled in the art.

FIG. 9 shows a flowchart of a method relating to operation of the hand-held power tool 10b. The method is, for the sake of simplicity, described on the basis of the hand-held power tool 10b illustrated in FIGS. 3 and 4. However, the method is also valid for the other exemplary embodiments of the inventive hand-held power tool which are shown in FIGS. 1 and 2, and 5 or 6, respectively. The method has at least one method step 42 in which the operator activates the active operating mode by actuating the switching element 14b. The operator activates the active operating state by pressing the switching element 14b. The method has at least one further method step 44 in which the locking unit 24b maintains the active operating mode independently of the actuation of the switching element 14b by the operator. The locking unit 24b is actuated, and the active operating mode is maintained, in the way already described above. The method comprises at least one further method step 46 in which a fault is detected, and the active operating mode which is maintained by means of the locking unit 24b is deactivated automatically as a function of the detected fault. The fault is detected by means of the sensor unit 30b of the hand-held power tool 10b which is provided for picking up the safety characteristic variable. The method can also comprise at least one further method step 70 in which at least one further open-loop and/or closed-loop control variable, such as, for example, the pressing force and/or the impact frequency, is picked up and evaluated.

What is claimed is:

1. A hand-held power tool comprising:
   a drive unit having a power supply;
   a tool holder operably connected to the drive unit;
   at least one switch device comprising at least one switching element and at least one locking unit; and
   at least one sensor unit configured to pick up a fault by picking up at least one safety characteristic variable, wherein:
   the at least one switching element is configured to activate the drive unit to drive the tool holder in response to an initial operator activation force on the at least one switching element;
   after activation of the drive unit, the at least one locking unit is configured to maintain the driving of the drive unit independently of an instantaneous operator activation force on the at least one switching element; and
   during the maintenance of the driving of the drive unit, the at least one locking unit is further configured to, in response to the at least one sensor unit detecting the fault, automatically switch off the drive unit, reduce a rotational speed of the drive unit, and/or reduce a power level of the drive unit.

2. The hand-held power tool according to claim 1, wherein the at least one sensor unit comprises at least one acceleration sensor.

3. The hand-held power tool according to claim 2, wherein the at least one acceleration sensor is configured to detect an acceleration of the hand-held power tool about a machining axis of the tool holder as the at least one safety characteristic variable.

4. The hand-held power tool according to claim 3, wherein:
the at least one sensor unit is configured to detect the fault in response to the acceleration of the hand-held power tool about the machining axis exceeding a predetermined threshold.

5. The hand-held power tool according to claim 1, wherein the at least one locking unit is configured with at least one timer function configured to at least partially automatically trigger the maintaining of the driving of the drive unit as a function of an actuation period of the at least one switching element.

6. The hand-held power tool according to claim 1, wherein:
the at least one locking unit includes at least one acoustic pick-up element configured to pick up at least one acoustic characteristic variable; and
the at least one locking unit is configured to perform at least one of open-loop control and closed-loop control of the maintaining of the driving of the drive unit as a function of the at least one acoustic characteristic variable.

7. The hand-held power tool according to claim 1, wherein:
the at least one locking unit includes at least one pick-up element configured to pick up a movement characteristic variable of an operator; and
the at least one locking unit is configured to perform at least one of open-loop control and closed-loop control of the maintaining of the driving of the drive unit as a function of the at least one movement characteristic variable.

8. The hand-held power tool according to claim 1, further comprising:
at least one sensor unit having at least one pressure sensor configured to pick up at least one pressing force,
wherein the at least one locking unit is configured to maintain the driving of the drive unit as a function of the at least one pressing force.

9. The hand-held power tool according to claim 1, further comprising:
at least one percussion mechanism; and
at least one sensor unit including at least one frequency sensor configured to pick up an impact frequency of the at least one percussion mechanism,
wherein the at least one locking unit is configured to perform at least one of open-loop control and closed-loop control of the maintaining of the driving of the drive unit as a function of the impact frequency.

10. The hand-held power tool according to claim 1, further comprising:
at least one communication unit configured to communicate with an external device,
wherein the at least one locking unit is configured to perform at least one of open-loop control and closed-loop control of the maintaining of the driving of the drive unit as a function of a communication between the communication unit and the external device.

11. The hand-held power tool according to claim 1, further comprising:
a control unit configured to:
operate the at least one switching element to activate the driving of the drive unit in response to the initial operator activation force; and
maintain, with the at least one locking unit, the driving of the drive unit independently of the instantaneous operator activation force.

12. The hand-held power tool according to claim 11, the control unit further configured to:
automatically deactivate the driving of the drive unit as a function of the detected fault.

13. A method for operating a hand-held power tool comprising:
activating a drive unit, which has a power supply, to drive a tool holder in response to an initial operator activation force by an operator on at least one switching element of at least switch device of the hand-held power tool;
after activation of the drive unit, maintaining, with at least one locking unit of the at least switch device of the hand-held power tool, driving of the drive unit independently of an instantaneous operator activation force by the operator on the at least one switching element;
detecting a fault by detecting at least one safety characteristic variable with at least one sensor unit; and
automatically switching off the drive unit, reducing a rotational speed of the drive unit, and/or reducing a power level of the drive unit with the at least one locking unit in response to detecting the fault.

14. The method according to claim 13, wherein the at least one sensor unit comprises at least one acceleration sensor, and the detecting of the fault includes detecting the at least one safety characteristic variable with the at least one acceleration sensor.

15. The method according to claim 14, wherein the detecting of the fault further comprises detecting, with the acceleration sensor, an acceleration of the hand-held power tool about a machining axis of the tool holder as the at least one safety characteristic variable.

16. The method according to claim 15, wherein the detecting of the fault further comprises detecting the fault in response to the acceleration of the hand-held power tool about the machining axis exceeding a predetermined threshold.

17. The method according to claim 13, further comprising:
automatically deactivating the drive unit as a function of the picked up fault.

* * * * *